United States Patent [19]

Andrä

[11] Patent Number: 5,388,481
[45] Date of Patent: *Feb. 14, 1995

[54] TORSION VIBRATION DAMPER

[75] Inventor: Rainer H. Andrä, Limburg, Germany

[73] Assignee: Firma Carl Freudenberg, Weinheim, Germany

[ * ] Notice: The portion of the term of this patent subsequent to Jun. 25, 2008 has been disclaimed.

[21] Appl. No.: 158,833

[22] Filed: Nov. 24, 1993

Related U.S. Application Data

[63] Continuation of Ser. No. 41,930, Apr. 2, 1993, abandoned, which is a continuation of Ser. No. 935,303, Aug. 26, 1992, abandoned, which is a continuation of Ser. No. 668,488, Mar. 13, 1991, abandoned, which is a continuation of Ser. No. 384,317, Jul. 24, 1989, Pat. No. 5,025,681.

[30] Foreign Application Priority Data

Jul. 23, 1988 [DE] Germany ............... 3825062

[51] Int. Cl.$^6$ ............................................. F16F 15/10
[52] U.S. Cl. ............................................ 74/574; 74/572
[58] Field of Search ............ 74/572, 574; 464/89; 29/450

[56] References Cited

U.S. PATENT DOCUMENTS

| | | | |
|---|---|---|---|
| 3,280,654 | 10/1966 | Arnt | 74/574 |
| 4,262,553 | 4/1981 | Bremer | 74/574 |
| 4,825,983 | 5/1989 | Nakanishi | 74/574 X |

FOREIGN PATENT DOCUMENTS

| | | | |
|---|---|---|---|
| 689240 | 6/1964 | Canada | 74/574 |
| 62233 | 4/1944 | Denmark | 74/574 |
| 0021975 | 1/1981 | European Pat. Off. | 74/574 |
| 0266479 | 5/1988 | European Pat. Off. | 74/574 |
| 582030 | 7/1933 | Germany | 74/574 |
| 2455385 | 5/1976 | Germany | 74/574 |
| 2744051 | 4/1979 | Germany | 74/574 |
| 55-135838 | 3/1977 | Japan | 74/574 |
| 307921 | 10/1929 | United Kingdom | 74/574 |
| 1574846 | 9/1980 | United Kingdom | 74/574 |

*Primary Examiner*—Vinh T. Luong
*Attorney, Agent, or Firm*—Kenyon & Kenyon

[57] ABSTRACT

A torsional vibration damper has a longitudinal axis of rotation about which an inertial damping mass is disposed. The inertial damping mass, which may be in the form of a ring, surrounds the periphery of a central hub connected to a shaft to be damped. The hub is connected to the damping mass by an elastic ring disposed in the space between the damping mass and hub to connect the damping mass and hub. The elastic ring may be formed of rubber or other suitable elastomeric material, and has a longitudinal profile that varies along the circumferential direction of the elastic ring.

10 Claims, 5 Drawing Sheets

TORSION VIBRATION DAMPER

This application is a continuation of application Ser. No. 08/041,930, filed Apr. 2, 1993, now abandoned, which is a continuation of Ser. No. 07/935,303, filed Aug. 26, 1992, now abandoned, which is a continuation of Ser. No. 07/668,488, filed Mar. 13, 1991, now abandoned, which is a continuation of Ser. No. 07/384,317, filed Jul. 24, 1989, now U.S. Pat. No. 5,025,681.

BACKGROUND OF THE INVENTION

1. Field of the Invention

The invention relates generally to torsional vibration dampers and, more particularly, to a torsional vibration damper having an improved capability to adapt to the specific damping requirements of the particular applications to which the damper may be used.

2. Description of Prior Art

A torsional vibration damper in which a central hub fixed to a shaft to be damped is secured to an outer inertial damping mass by an elastic ring disposed in an annular space between the hub and the damping mass is disclosed in EP-PS 0 021 975. One of the problems with a damper of this type is that its capability to adapt to the specific damping requirements of a particular application to which the damper may be used is limited. Hence, the performance of the damper for a particular application may not be very satisfactory.

SUMMARY OF THE INVENTION

Thus, one of the problems to which the invention is directed is the provision of a torsional vibration damper that has an improved ability to adapt to the specific damping requirements of a range of particular applications to which the damper may be used. The invention solves this problem by providing a torsional vibration damper having a longitudinal axis of rotation that comprises: (a) a central hub having means for connection to a part to be damped; (b) an inertial damping mass spaced from the central hub to form a longitudinally extending gap surrounding the central hub; and (c) an elastic ring disposed in the gap in adherent contact between the central hub and the inertial damping mass for connecting the central hub to the inertial damping mass. The elastic ring has successive subsections along the circumferential direction of the elastic ring, with at least one of the subsections uniformly merging into adjacent subsections and being spaced at a different distance from the longitudinal axis of rotation than the distance of other subsections from the longitudinal axis. The elastic ring has a longitudinal profile that varies along the circumferential direction of the ring.

In the torsional vibration damper of the invention, the profile of the elastic ring profile refers to the longitudinal cross section, which varies along the circumferential direction of the ring. The damping performance characteristics of the torsional damper thereby is selectively adapted for differing damping applications, especially those applications in which the torsional vibrations to be damped are also superimposed by longitudinal and transverse vibrations.

The torsional vibration damper of the invention can be manufactured using a simple method that is similar to the one used in previously known torsional dampers. Consequently, it is possible to manufacture the elastic ring separately from the inertial ring and the central hub and then unite the elastic ring to the hub and to the inertial ring in a final assembly step to form a self-enclosed damping unit. However, according to the invention, it is also possible to form the elastic ring from rubber. The elastic ring may be formed by injecting a rubber compound directly into the gap between the inertial ring and the hub ring. The rubber compound then is vulcanized and solidified in the gap to form the elastic ring. This process is one way to produce the required adherent connections between the rubber ring and the inner surface of the inertial ring and rubber ring and the outer surface of the central hub.

In perhaps the simplest embodiment of torsional vibration damper of the invention, the profile, i.e., the longitudinal cross section, of the elastic ring may be varied along in the circumferential direction of the ring by forming successive circumferential subsections of the elastic ring with different radial thicknesses. With this construction, an improved isolation of high frequency torsional vibrations is attained, for example, when the radial thickness of the individual subsections of the elastic ring is relatively enlarged.

In addition to varying the radial thickness of the circumferential subsections or alternatively thereto, the profile of the elastic ring may be varied such that successive circumferential subsections of the elastic ring have a form or shape that deviates from one another when viewed in longitudinal section. In addition to the improved damping of torsional vibrations for a variety of differing damping applications, this type of construction is also effective to damp longitudinal and transverse vibrations of the machine part to be damped, for example, the vibrations of a crankshaft. In such an embodiment, the profile of the elastic ring may have an outwardly curved bell shape formed in at least one longitudinal plane of the torsional vibration damper such that the bell shaped curve has a peak height, which varies along the circumferential direction of the elastic ring.

The possibilities for varying the shape of the profile of the elastic ring are numerous. For example, at least one circumferential position of the elastic ring may include a neutral or inwardly projecting peak height, which forms a valley instead of the outwardly projecting bell shape discussed above. When both an outwardly projecting bell shape profile and an inwardly projecting valley shaped profile are provided along the circumference of an elastic ring, a reciprocal relationship results in which a high level of stability in the axial direction is attained between the hub ring and the inertial ring, when a tubular elastic ring is employed. With this type of construction, additional measures to secure the parts together are mostly unnecessary.

To avoid any imbalance in the damper, it is advantageous for matching profiles to be provided in at least two circumferential points that are uniformly distributed about the circumference of the elastic ring. The actual number of such circumferential points provided with matching profiles is generally arbitrary and may be determined by the size of the torsional vibration damper. For automotive applications, it is usually sufficient to have three to four such circumferential positions provided with matching profiles, which are uniformly distributed over its circumference.

Further advantages, features and embodiments of the invention are apparent from consideration of the following detailed description, drawings and appended claims.

DETAILED DESCRIPTION

Figure 1:
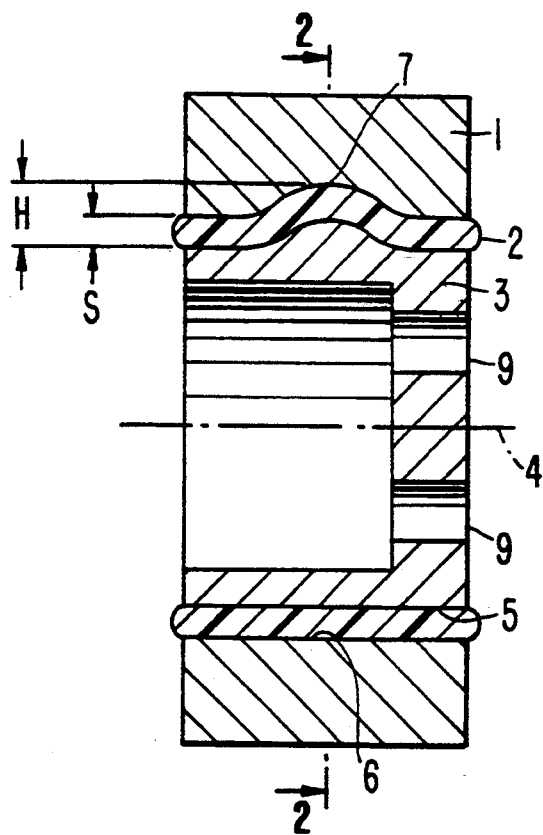
FIG. 1 illustrates a longitudinal cross sectional view of a torsional vibration damper constructed according to the principles of the invention.
Figure 2:
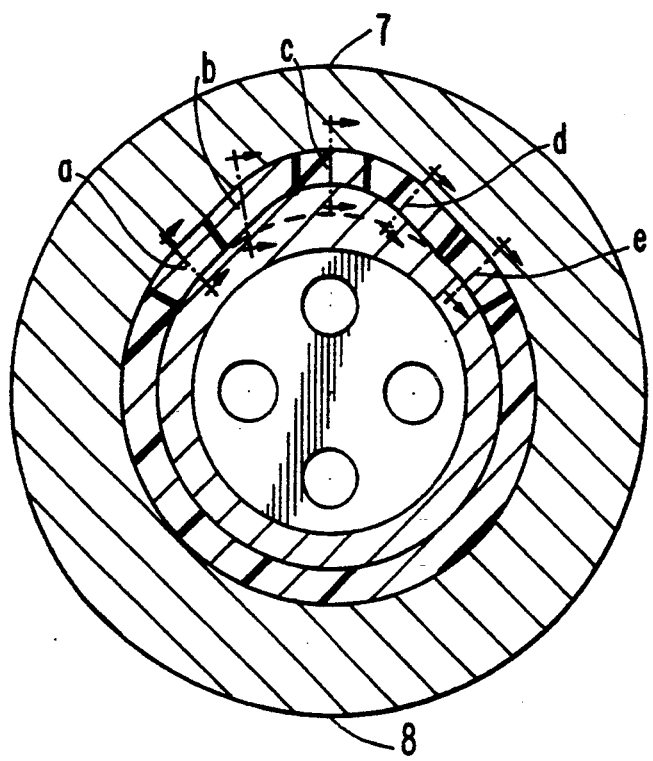
FIG. 2 illustrates the torsional vibration damper of FIG. 1 in a transverse cross sectional view taken along line 2—2.
Figure 2A:
FIG. 2A-2E show the profiles of successive subsections a-e of the elastic ring of FIG. 2 in longitudinal cross section.
Figure 2B:
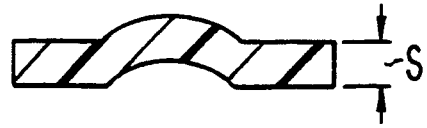
Figure 2C:
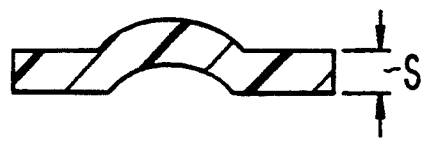
Figure 2D:
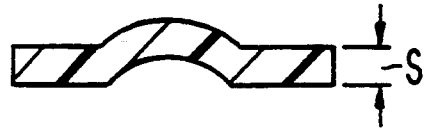
Figure 2E:

The torsional vibration damper illustrated in FIG. 1 includes an inertial damping mass in the form of a ring 1, which is secured to the outer periphery of a central hub 3 by means of an enclosed elastic ring 2. The elastic ring 2 may be formed from rubber or other suitable material, such as an elastomeric material. The outer surface 5 of the central hub 3 and the inner surface 6 of the inertial ring i are in adherent contact with the elastic ring 2. One method of producing the adherent connections is to form the ring 2 from a rubber compound directly injected into and vulcanized in the gap between hub 3 and ring 1. The ring 2 may be thought of as being formed from successive, longitudinal subsections spaced about the circumference of the ring at varying distances from the axis of rotation 4 of the damper. FIG. 2 shows five such subsections a-e, which have profiles shown in longitudinal cross section in FIG. 2A-2E, respectively. In this embodiment, the thickness S of the various subsections may be constant. The subsections smoothly and uniformly merge into each other. The variable spacing of the subsections a-e from the axis of rotation in both the longitudinal and circumferential directions of the torsional vibration damper, is apparent from FIG. 2 and FIGS. 2A-2E. Starting from the peak point 7, which as shown in FIG. 2C lies in the approximate middle of the longitudinal extent of ring 2, the outside diameter of the ring 2 uniformly decreases along the circumference of ring 2, when moving in a direction from point 7 toward point 8 lying on the radial opposite side of ring 2. Well before point 8 is reached, the diameter of ring 2 becomes constant and the remaining subsections between the profiles of FIGS. 2A and 2E are spaced at constant distance from axis 4. In addition to fixing the longitudinal position of the inertial ring 1 relative to the hub 3, this arrangement provides a relatively smooth bearing arrangement for the inertial ring 1 to facilitate effective damping of torsional vibrations of a relatively high torsional amplitude.

Figure 3A:
FIGS. 3A-3E show the profiles of successive subsections f-j of another embodiment of an elastic ring of the invention in longitudinal cross section.
Figure 3B:
Figure 3C:
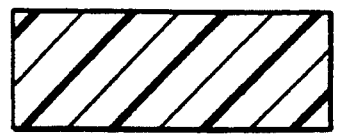
Figure 3D:
Figure 3E:
Figure 3:
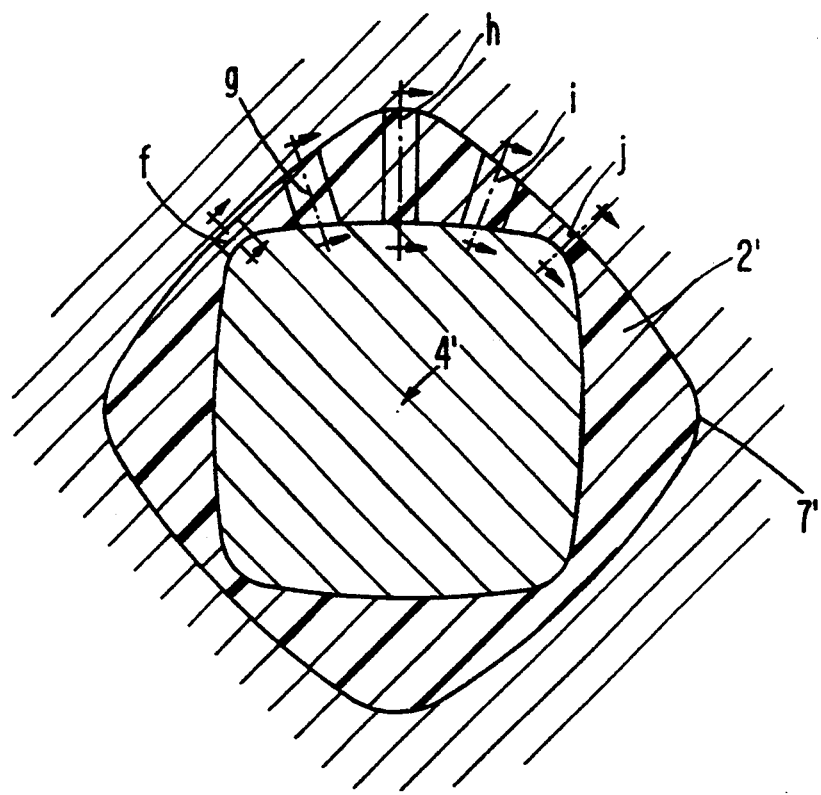
FIGS. 3 to 5 show alternative embodiments of the elastic ring of the invention in which the elastic ring is built into the damper.
Figure 4:
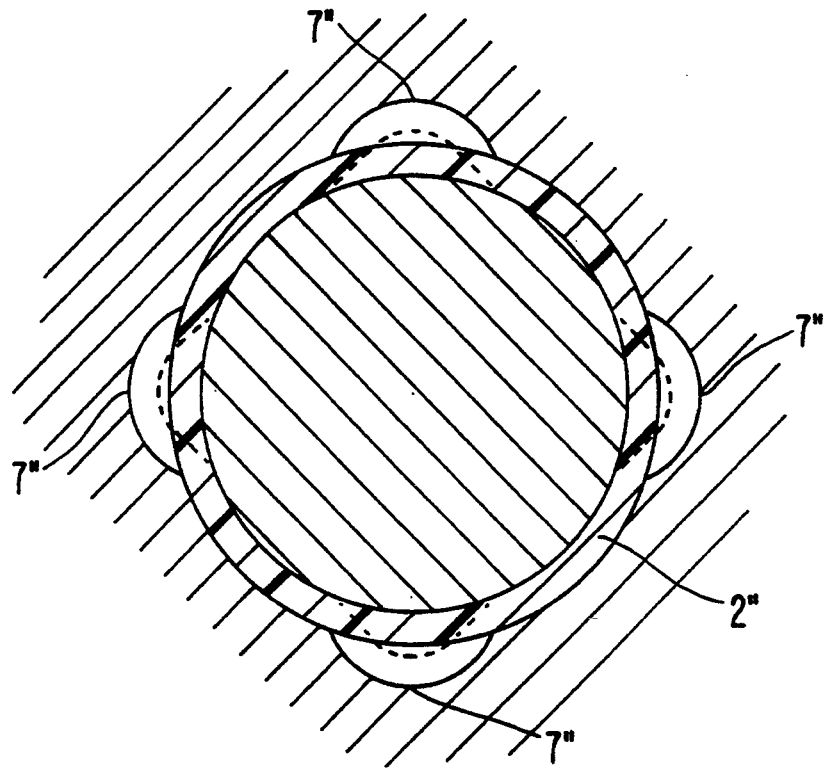
Figure 5:
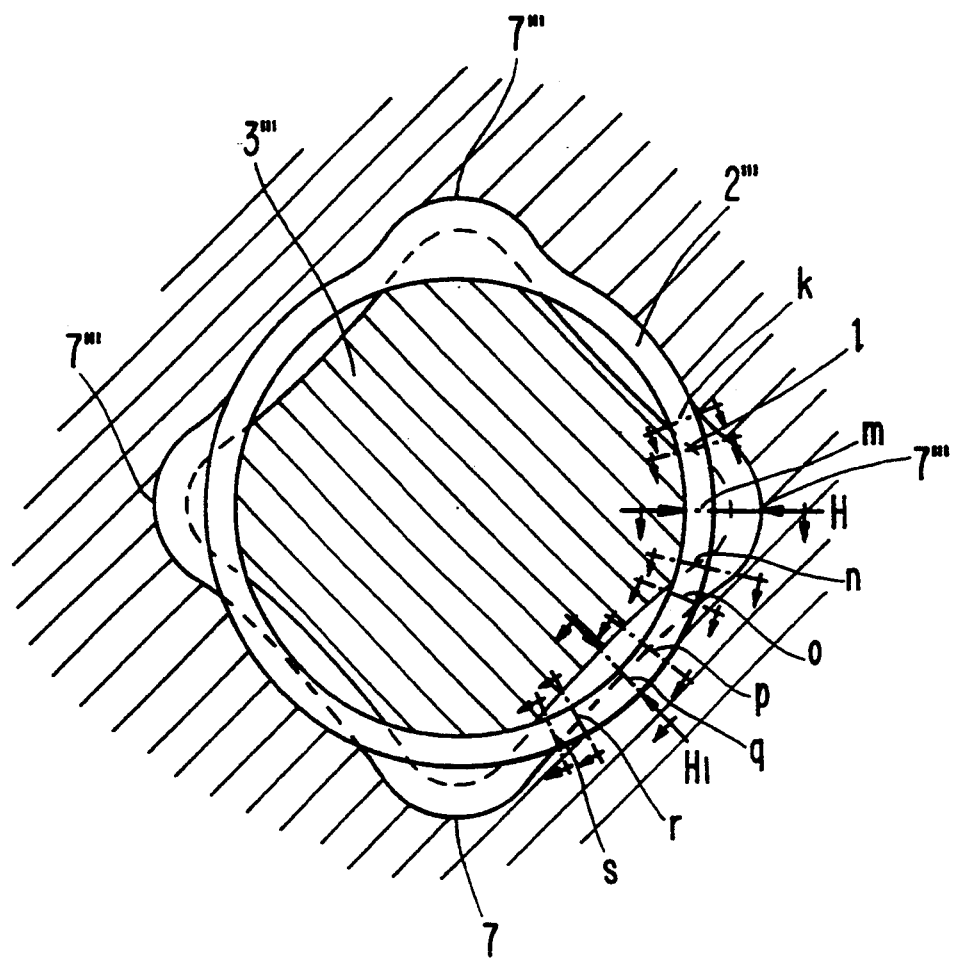
Figure 5A:
FIGS. 5A-5I shows the profiles of successive subsections k-s of the elastic ring of FIG. 5 in longitudinal cross section.
Figure 5B:
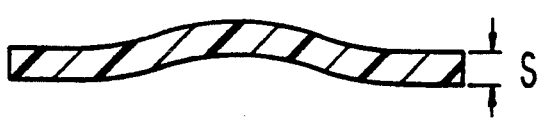
Figure 5C:
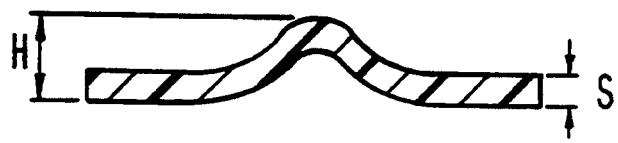
Figure 5D:
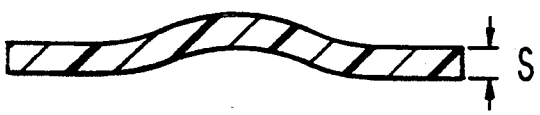
Figure 5E:
Figure 5F:
Figure 5G:
Figure 5H:
Figure 5I:

Each of the elastic rings 2', 2", 2''' shown in FIGS. 3 to 5 can be thought of as comprising four successive circumferential subsections having a matching, but variable profile in which the subsections are equidistantly spaced about the circumference of the rings.

In the embodiment of FIG. 3, the profiles of the subsections of ring 2' are characterized by a progressive change in thickness in the circumferential direction of the ring. The change in thickness in the profiles is evident from FIG. 3 and also from FIGS. 3A-3E, which illustrate various subsections f-j, respectively, in longitudinal cross section in a manner similar to FIGS. 2A-2E. The variable thickness improves the circumferential stiffness of the elastic ring. The axially inner and outer surfaces of the elastic ring extend parallel to the axis of rotation 4' as evident from FIGS. 3A-3E.

In the embodiment of FIG. 4, the ring 2" has four circumferentially successive subsections, each of which has a form or shape that deviates from the other. The longitudinal profile of the ring 2" can be described at the four circumferential locations 7" as being outwardly curved to form a bell shape. However, the height of the peak of each bell is different At any of the circumferential positions 7", the radial thickness of the ring 2" can be identical. If necessary, however, the ring 2" also can be formed, in accordance with FIG. 3, with a radial thickness that varies along the circumferential direction of the ring.

The embodiment of the ring 2''' of FIG. 5 is similar to the FIG. 4 embodiment described above in that it has peaks at successive subsections 7''' distributed about the circumference of the ring. However, in this embodiment, the subsections of ring 2''' disposed between peaks 7''' are provided with an inner convex surface, which projects inwardly toward hub 3''' to form a valley between adjacent peaks 7'''. The ring 2''' has a radial depth $H_1$ at the valley section disposed midway between adjacent peaks. The inner convex surfaces of the ring 2''' disposed between peaks 7''' are in adherent contact with corresponding concave outer surfaces of hub 3'''. Similar to FIGS. 2 and 3, FIG. 5 shows successive, longitudinal subsections k-s, which have profiles shown in longitudinal cross section in FIG. 5A-5I, respectively. A torsional vibration damper of this type is not only especially longitudinally stable, but also exhibits an excellent ability to damp longitudinal and/or transverse vibrations. Longitudinal vibrations have amplitudes extending parallel to the longitudinal axis of the damper, while transverse vibrations have amplitudes extending perpendicular thereto. Along with torsional vibrations, these longitudinal and transverse vibrations may be introduced by the machine part to be damped, which, as known in the art, may be connected to the central hub 3 of the damper for instance, via holes 9 shown in FIG. 1.

What is claimed is:

1. A torsional vibration damper having a longitudinal axis of rotation comprising:
   (a) a central hub having means for connection to a part to be damped;
   (b) an inertial damping mass spaced from the central hub to form a longitudinally extending gap surrounding the central hub;
   (c) an elastic ring disposed in said gap in adherent contact between the central hub and the inertial damping mass for connecting the central hub to the inertial damping mass, said elastic ring having
      (i) successive subsections along the circumferential direction of the elastic ring, with at least one of said subsections uniformly and smoothly merging into adjacent subsections and being spaced at a different distance from the longitudinal axis of rotation than the distance of other subsections from the longitudinal axis, said subsections being of uniform thickness; and (ii) a longitudinal profile that smoothly varies along the circumferential direction of the ring.

2. The torsional vibration damper of claim 1 wherein the radial thickness of said successive subsections varies along the circumferential direction of the elastic ring.

3. The torsional vibration damper of claim 1 wherein each of said successive subsections has a shape that deviates from the shape of the other subsections.

4. The torsional vibration damper of claim 2 each of said successive subsections has a shape that deviates from the shape of the other subsections.

5. The torsional vibration damper of claim 3 wherein the longitudinal profile of the elastic ring has a bell curve shape outwardly projecting from more than one longitudinal plane of the torsional vibration damper and-said bell curve shape has a peak height that varies in the circumferential direction of the elastic ring.

6. The torsional vibration damper of claim 5 wherein the longitudinal profile of the elastic ring includes a curved valley shape inwardly projecting from at least one circumferential position adjacent said outwardly projecting bell curve shape, said curved valley shape having a thickness that varies in the circumferential direction of the elastic ring.

7. The torsional vibration damper of claim 1 wherein said at least one subsection comprises at least two subsections having matching longitudinal profiles equidistantly spaced about the circumference of the elastic ring.

8. The torsional vibration damper of claim 1 wherein said inertial damping mass comprises a ring.

9. The torsional vibration of claim 7 wherein said central hub comprises a ring.

10. The torsional vibration damper of claim 1 wherein said elastic ring comprises a rubber ring vulcanized in said longitudinally extending gap to adhesively connect the rubber ring to the inertial damping mass and to the central hub.

* * * * *